United States Patent [19]

Koyama

[11] Patent Number: 4,813,032
[45] Date of Patent: Mar. 14, 1989

[54] MAGNETO-OPTICAL INFORMATION REPRODUCING APPARATUS IN WHICH THE AZIMUTH ANGLE OF THE TRANSMISSION AXIS OF AN ANALYZER IS OPTIMIZED SO THAT THE C/N RATIO OF A REPRODUCING SIGNAL IS MAXIMUM

[75] Inventor: Osamu Koyama, Kawasaki, Japan

[73] Assignee: Canon Kabushiki Kaisha, Tokyo, Japan

[21] Appl. No.: 106,787

[22] Filed: Oct. 13, 1987

[30] Foreign Application Priority Data

Oct. 17, 1986 [JP] Japan .................. 61-246616
Oct. 17, 1986 [JP] Japan .................. 61-246618

[51] Int. Cl.$^4$ ................ G11B 11/14; G11B 5/127; G11B 13/04
[52] U.S. Cl. .................. 369/13; 360/114; 350/407; 369/110
[58] Field of Search ............ 369/13, 110, 120; 360/114, 59; 365/122; 350/407, 376

[56] References Cited

U.S. PATENT DOCUMENTS

| | | | |
|---|---|---|---|
| 4,398,806 | 8/1983 | Bennett et al. | 350/407 |
| 4,558,440 | 12/1985 | Tomita | 360/114 |
| 4,561,032 | 12/1985 | Matsumoto | 369/13 |
| 4,569,035 | 2/1986 | Tomita | 365/122 |
| 4,672,593 | 6/1987 | Ojima et al. | 369/110 |
| 4,712,203 | 12/1987 | Saito et al. | 360/114 |
| 4,721,368 | 1/1988 | Deguchi et al. | 369/13 |

FOREIGN PATENT DOCUMENTS

61-13460 1/1986 Japan ............... 369/13

*Primary Examiner*—Alan Faber
*Assistant Examiner*—Hoa T. Nguyen
*Attorney, Agent, or Firm*—Fitzpatrick, Cella, Harper & Scinto

[57] ABSTRACT

In a magneto-optical information reproducing apparatus, the angle $\theta A$ formed between the optic axis of an analyzer for analyzing reflected or transmitted light from a recording medium and a predetermined direction corresponding to a light polarization direction satisfies the following conditions:

$$\sin^2\theta_A \sim \frac{F_R + S + T}{(1 - \eta_A)\{(1 + \eta_A)F_R + S\}} \left(1 - \sqrt{\frac{(\eta_A)^2 F_R + \eta_A S + T}{F_R + S + T}}\right)$$

$$F_R = \xi \cdot (\kappa\epsilon|t_A|^2 |R|^2 I_O)^2 \cdot \Delta B$$

$$S = 2e\kappa\epsilon|t_A|^2 |R|^2 I_O \cdot \Delta B$$

where the average of the intensities of polarized components entering a photodetector for detecting light from the analyzer and not modulated by the magneto-optical effect is $\bar{I}r$, the square mean of the intensity fluctuation in a magneto-optical signal observation frequency is $\Delta I_r^2$, $\xi = \Delta I_r^2/\bar{I}r^2$, the quantity of light of the incident light beam on the recording medium is $I_O$, the amplitude reflectance of the recording medium is R, the light utilization efficiency of an optical system from the recording medium to the photodetector except the analyzer is $\epsilon$, the photoelectric conversion efficiency of the photodetector is k, the amount of charge is e, the thermal noise of an amplifier for amplifying the signal detected by the photodector in the magneto-optical signal observation frequency is T, the band width of the detection signal is $\Delta B$, the amplitude transmittance of the analyzer is $t_A$, and the extinction ratio of the analyzer is $\eta_A$. Also, in case that the apparatus includes a beam splitter therein, the condition of the angle $\theta A$ is decided.

10 Claims, 8 Drawing Sheets

MAGNETO-OPTICAL INFORMATION REPRODUCING APPARATUS IN WHICH THE AZIMUTH ANGLE OF THE TRANSMISSION AXIS OF AN ANALYZER IS OPTIMIZED SO THAT THE C/N RATIO OF A REPRODUCING SIGNAL IS MAXIMUM

BACKGROUND OF THE INVENTION

1. Field of the Invention

The present invention relates to a magneto-optical information reproducing apparatus for reproducing information magnetically recorded on a recording medium by the utilization of the magneto-optical effect.

2. Description of the Related Art

In recent years, optical memories for effecting recording and reproduction by a laser beam have been actively studied and developed for practical use as high-density recording memories. Of these, magneto-optical disks capable of erasing and re-writing have been regarded as promising with optical disks used exclusively for reproduction typified by compact disks and direct read after write (DRAW) type optical disks. Magneto-optical disks are such that information is magnetically recorded by the utilization of the localized temperature rise of a magnetic thin film caused by the application of a laser spot thereto and the information is reproduced by the magneto-optical effect (particularly the Kerr effect). The Kerr effect refers to the phenomenon that the plane of polarization is rotated when light is reflected by a magnetic recording medium.

The basic construction of a magneto-optical disk apparatus according to the prior art is shown in FIG. 1 of the accompanying drawings. In FIG. 1, the reference numeral 1 designates a semiconductor laser, the reference numeral 2 denotes a collimator lens, the reference numeral 11 designates a half-mirror, the reference numeral 4 denotes an objective lens, the reference numeral 6 designates a magneto-optical recording medium, the reference numeral 7 denotes an analyzer, the reference numeral 8 designates a condensing lens, and the reference numeral 9 denotes a photodetector. The direction of P-polarization is parallel to the plane of the drawing sheet, and the direction of S-polarization is perpendicular to the plane of the drawing sheet.

Description will now be made of a case where magneto-optical information is reproduced in such an apparatus. A light beam emitted from the semiconductor laser 1 as a rectilinearly polarized light in the direction of P-polarization is collimated by the collimator lens 2 and passes through the half-mirror 11. If the P-polarized component amplitude transmittance is tp and the S-polarized component amplitude transmittance is ts, $|tp|^2 = |ts|^2 = 0.5$ in the half-mirror 11. The light beam is imaged as a minute spot on the magneto-optical recording medium 6 by the objective lens 4. Where a magnetic section (pit) is pre-formed on the medium 6, as shown in FIG. 2 of the accompanying drawings, the reflected light from the medium 6 is subjected to the rotation of the plane of polarization of $\pm \theta k$ by the Kerr effect in conformity with whether the direction of magnetization of the illuminated area is upward or downward. Here, if the P-polarized component of the amplitude reflectance of the recording medium 6 is R and the S-polarized component is K, the following equation is established:

$$\theta k = |K|/|R| \tag{1}$$

The magneto-optically modulated reflected light is again collimated by the objective lens 4 and reflected by the half-mirror 11, whereafter it is comverted to a light beam intensity-modulated by the analyzer 7. That is, in FIG. 2, the reflected light is analyzed as a regular projection of the amplitude thereof onto the optic axis of the analyzer and therefore, if the intensity of the incident light onto the magneto-optical medium is $I_O$ and the angle of the optic axis of the analyzer with respect to the direction of P-polarization is $\theta A$, the intensities $I + \theta_K$ and $I - \theta_K$ of the light beams transmitted through the analyzer in conformity with the Kerr rotation angles $\pm \theta k$ can be expressed as follows:

$$\begin{cases} I + \theta_K = \frac{1}{2} I_O (|R| \cos \theta_A + |K| \sin \theta_A)^2 \\ I - \theta_K = \frac{1}{2} I_O (|R| \cos \theta_A - |K| \sin \theta_A)^2 \end{cases} \tag{2}$$

Since $\theta k \sim 1°$, $|R|^2 >> |K|^2$ is established and thus, equation (2) can be expressed as follows:

$$\begin{cases} I + \theta_K \sim \frac{I_O}{2} (|R|^2 \cos^2 \theta_A + |R||K| \sin 2\theta_A) \\ I - \theta_K \sim \frac{I_O}{2} (|R|^2 \cos^2 \theta_A - |R||K| \sin 2\theta_A) \end{cases} \tag{3}$$

In expression (3), the second term in the parentheses is the magneto-optical modulated component and the first term in the parentheses is the non-modulated component, and the intensities thereof are defined as $I_k$ and $I_r$, respectively.

$$I_k \sim \frac{I_O}{2\sqrt{2}} |R||K| \sin 2\theta_A \tag{4}$$

$$I_r \sim \frac{I_O}{2} |R|^2 \cos^2 \theta_A \tag{5}$$

Such a detection light beam is detected as a magneto-optical signal by the photodetector 9 via the condensing lens 8.

Considering that the rotation angle $\theta k$ of the plane of polarization by the Kerr effect is generally of the order of 1° and that the magneto-optical modulated component obtained through the analyzer 7 is of a very minute amount, it is necessary that the azimuth angle $\theta A$ of the optic axis of the analyzer be set to such as optimum position that the C/N (the ratio between the carrier wave and the noise) of the detection signal becomes maximum. For example, in U.S. Pat. No. 4,569,035 issued on Feb. 4, 1986, there is shown an example of an apparatus using as a photodetector an avalanche photodiode (APD) or the like having a multiplying action wherein the azimuth of the transmission axis (the optic axis) of the analyzer is optimized. On the other hand, in an apparatus using as a photodetector a PIN photodiode or the like having no multiplying action, the azimuth angle $\theta A$ of the optical axis of the analyzer has been set to 45° with respect to the direction of polarization of the incident light beam in order to maximize the magneto-optical modulated component intensity expressed by expression (4). However, when the noise superposed on the detection signal is taken into consideration, maximum C/N cannot always be obtained by providing $\theta A=45°$.

On the other hand, a magneto-optical information reproducing apparatus using a polarizing beam splitter instead of the half-mirror 11 shown in FIG. 1 to improve the C/N of the above-mentioned reproducing signal is proposed in U.S. Pat. No. 4,561,032 issued on Dec. 24, 1986. Further, an example in which the polarizing characteristic of this polarizing beam splitter is set so that C/N is maximum is disclosed in U.S. Pat. No. 4,558,440 issued on Dec. 10, 1985. However, in these examples as well, the azimuth angle of the optic axis of the analyzer is defined as 45°, and no mention is made of optimizing this azimuth angle and a specific method therefor.

SUMMARY OF THE INVENTION

It is the object of the present invention to further improve the above-described prior art and to provide a magneto-optical information reproducing apparatus which is simple in construction and capable of reproducing magneto-optical signals having a good C/N by the use of an inexpensive photodetector such as a PIN photodiode having no amplifying action.

The above object of the present invention is achieved by constructing a magneto-optical information reproducing apparatus of means for applying a light beam polarized in a predetermined direction onto a recording medium on which information is magnetically recorded, analyzer means for analyzing the reflected or transmitted light beam from said recording medium modulated into a polarized state in conformity with said information by the magneto-optical effect, a photodetector having no amplifying action and photoelectrically detecting the light beam transmitted through said analyzer means, and amplifying means for amplifying the detection signal of said photodetector and reproducing said information, and setting the angle $\theta A$ formed between the optic axis of said analyzer means and said predetermined direction so as to satisfy the following conditions:

$$\sin^2 \theta_A \sim \frac{F_R + S + T}{(1 - \eta_A)\{(1 + \eta_A) F_R + S\}} \left(1 - \sqrt{\frac{(\eta_A)^2 F_R + \eta_A S + T}{F_R + S + T}}\right)$$

$$F_R = \xi \cdot (\kappa\epsilon |t_A|^2 |R|^2 I_O)^2 \cdot \Delta B$$

$$S = 2e\kappa\epsilon |t_A|^2 |R|^2 I_O \cdot \Delta B$$

where the average of the intensities of polarized components entering said photodetector and not modulated by the magneto-optical effect is $\bar{I}_r$, the square means of the intensity fluctuation in a magneto-optical signal observation frequency is $\Delta I_r^2$, $\xi = \Delta I_r^2/\bar{I}_r^2$, the quantity of light of the incident light beam on said recording medium is $I_O$ the amplitude reflectance of said recording medium is R, the light utilization efficiency of the optical system from the recording medium to the photodetector except said analyzer means is $\epsilon$, the photoelectric conversion efficiency of said photodetector is $\kappa$, the amount of charge is e, the thermal noise of said amplifying means in the magneto-optical signal observation frequency is T, the band width of the detection signal is $\Delta B$, the amplitude transmittance of said analyzer means is tA, and the extinction ratio of said analyzer means is $\eta A$.

Also, where the light from the recording medium is directed to the photodetector through a polarizing beam splitter, the above object is achieved by setting the polarized light reflectance-transmittance characteristic of the polarizing beam splitter and the azimuth of the optic axis of detecting means so as to satisfy the following conditions. That is, where the photodetector detects the reflected light from the polarizing beam splitter, $$|r_p|^2 \sim \sqrt{\frac{T}{\xi \cdot \Delta B}} \cdot \frac{1}{\kappa\epsilon |t_A|^2 |R|^2 I_O}, 0 \leq |r_p|^2 \leq 1$$

$$|r_s|^2 \sim 1$$

$$\sin \theta_A \sim \frac{1}{\sqrt{1 + \sqrt{\eta_A}}}$$

and where the photodetector detects the light transmitted through the polarizing beam splitter, $$|t_s|^2 \sim \sqrt{\frac{T}{\xi \cdot \Delta B}} \cdot \frac{1}{\kappa\epsilon |t_A|^2 |R|^2 I_O}, 0 < |t_s|^2 < 1$$

$$|t_p|^2 \sim 1$$

$$\sin \theta_A \sim \frac{1}{\sqrt{1 + \sqrt{\eta_A}}}$$

where the amplitude reflectance and the amplitude transmittance of said polarizing beam splitter for the polarized component in said predetermined direction are rp and ts, respectively, and the amplitude reflectance and the amplitude transmittance of said polarizing beam splitter for the polarized component in a direction perpendicular to said predetermined direction are rs and tp, respectively.

DESCRIPTION OF THE PREFERRED EMBODIMENTS

Figure 3:
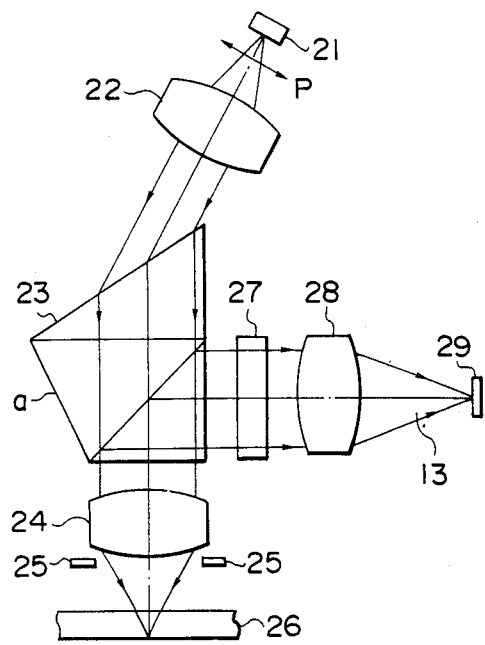
FIG. 3 schematically shows an optical system according to an embodiment of the present invention.
Figure 4:
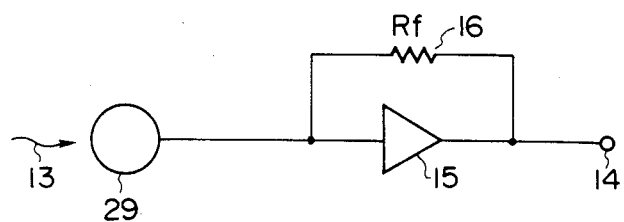
FIG. 4 schematically shows a signal processing system in the embodiment shown in FIG. 3.

The present invention will hereinafter be described in detail with reference to the drawings. FIGS. 3 and 4 show a first embodiment of a magneto-optical information reproducing apparatus according to the present invention, and more particularly, FIG. 3 schematically shows the construction of an optical system and FIG. 4 schematically shows the construction of a signal processing circuit. In FIG. 3, the reference numeral 21 designates a semiconductor laser, the reference numeral 22 denotes a collimator lens, the reference numeral 23 designates a half-mirror, the reference numeral 24 denotes an objective lens, the reference numeral 26 designates a magneto-optical recording medium, the reference numeral 27 denotes an analyzer, the reference numeral 28 designates a condensing lens, and the reference numeral 29 denotes a photodetector. The direction of P-polarization is parallel to the plane of the drawing sheet, and the direction of S-polarization is perpendicular to the plane of the drawing sheet. The reference numeral 13 designates a light beam transmitted through the analyzer 27. This detection light beam 13 is photoelectrically converted by the photodetector 29 as shown in FIG. 4, is voltage-amplified by an amplifier 15 including a load resistor 16 and is output as a reproduction signal from a terminal 14.

The half-mirror 23 has a beam shaping function, whereby the light beam of the semiconductor laser 21 having an elliptical far field image can be efficiently imaged as a circular spot on the recording medium 26. A surface a is inclined by a predetermined angle so that no stray light enters the photodetector 29. On the recording medium 26, tracking grooves (not shown) are formed in a direction perpendicular to the plane of the drawing sheet, and the light condensed on the recording medium 26 by the objective lens 24 is diffracted by these grooves. The reference numeral 25 designates a photodetector for detecting the unbalance of ±1st-order diffracted lights caused by track deviation. The photodetector 25 is fixed to the marginal edge of an opening in the objective lens 24. Therefore, there is an advantage that no offset is caused in the tracking error signal even if the objective lens 24 is moved in a direction perpendicular to the track grooves. The photodetector 29 is a photodetector having no amplifying action, such as an Si-PIN photodiode, and effects the detection of a magneto-optical signal and a focus error signal. A conventional method is used for the detection of the focus error, but it has no direct relation with the present invention and therefore need not be described in detail.

In the above-described apparatus, the semi-conductor laser 21 emits a P-polarized light beam. This emitted light beam is collimated by the collimator lens 22, and is transmitted through the half-mirror 23 to be applied as a light spot of intensity $I_O$ onto the recording medium 26 by the objective lens 24. The light beam reflected by the recording medium 26 is modulated into a polarized state in conformity with the information magnetically recorded on the recording medium 26, again passes through the objective lens 24, is reflected by the half-mirror 23 and is directed to the analyzer 27. The detection light 13 passed through the analyzer 27 is intensity-modulated and is received by the photodetector 29 through the condensing lens 28.

The light beam 13 passed through the analyzer 27 and intensity-modulated is converted into a photocurrent by the photodetector 29 shown in FIG. 4. The photoelectric conversion efficiency κ is given by the following equation:

$$\kappa = (e\rho)/(h\nu), \quad (6)$$

where e is the amount of charge, h is Planck's and constant, $\rho$ is the quantum efficiency of the photodetector and $\nu$ is the frequency of the light beam. In this regard, the following four kinds of noises are considered to be noise sources in signal reading-out:

(1) the noise attributable to the square mean intensity fluctuation $\Delta I_r^2$ of a non-modulated component light $I_r$;

(2) the noise attributable to the square mean intensity fluctuation $\Delta I_k^2$ of a modulated component light $I_k$;

(3) the shot noise of the photodetector; and (4) the thermal noise by the amplifier.

The noise by $\Delta I_r^2$ mentioned under item (1) above and the noise by $\Delta I_k^2$ mentioned under item (2) above are affected by the surface roughness and heterogeneity of the recording medium and the intensity fluctuation of the semiconductor laser, and if the constants determined by the noise sources such as the medium and the semi-conductor laser are ξ and ζ, respectively, and the averages of the actual effective values of the non-modulated component and the modulated component are $\bar{I}_r$ and $\bar{I}_k$, respectively, then the following equations are established:

$$\Delta I_r^2 = \xi I_r^2 \Delta B \quad (7)$$

$$\Delta I_k^2 = \zeta I_k^2 \Delta B \quad (8)$$

where ΔB is the band width of the detection signal. If the noise attributable to $\Delta I_r^2$, the noise attributable to $\Delta I_k^2$, the shot noise and the thermal noise are $F_r$, $F_k$, S and T, respectively, they can be expressed as follows:

$$F_r = \xi \kappa^2 I_r^2 \Delta B \quad (9)$$

$$F_k = \xi \kappa^2 I_k^2 \Delta B \quad (10)$$

$$S = e \kappa I_r \Delta B \quad (11)$$

$$T = \frac{4kTe}{R_f} \Delta B \quad (12)$$

where k is the Boltzmann constant, Te is the equivalent noise temperature and Rf is the resistance value of the load resistor 16.

By equations (4) and (5), with respect to the azimuth angle θA of the optic axis of the analyzer, the magneto-optical modulated component intensity $I_k$ has the dependency of $\sin^2 \theta A$ and the non-modulated component intensity $I_r$ has the dependency of $\cos^2 \theta A$ and therefore, the θA-dependencies of the respective noises can be expressed as follows:

$$F_r \propto \cos^4 \theta A \quad (13)$$

$$F_k \propto \sin^2 \theta A \quad (14)$$

$$S \propto \cos^2 \theta A \quad (15)$$

$$T = \text{const} \tag{16}$$

By the use of these, C/N can be expressed in decibel form as follows:

$$C/N = 10 \log_{10}\left\{ \frac{1}{2} \kappa^2 I_k^2 \bigg/ \left( \xi \kappa^2 I_r^2 + \frac{1}{2} \xi \kappa^2 I_k^2 + 2e\kappa I_r + \frac{4kTe}{Rf} \right) \Delta B \right\} \tag{17}$$

The C/N of equation (17) is a function of the azimuth angle $\theta A$ of the optic axis of the analyzer and therefore, equation (17) is differentiated by $\theta A$ to find the extremal value.

The extremal value found with respect to $\theta A$ is as follows:

$$\sin^2 \theta_A \sim \frac{f_R + S + t}{f_R + S}\left\{ 1 - \sqrt{\frac{t}{f_R + S + t}} \right\} \tag{18}$$

$$f_R = \xi \left( \frac{1}{2} \kappa |R|^2 I_O \cos^2 \theta_A \right)^2 \cdot \Delta B \tag{19}$$

$$S = e\kappa |R| I_O \cos^2 \theta_A \cdot \Delta B \tag{20}$$

$$t = T \tag{21}$$

If the azimuth angle of the optic axis of the analyze which will satisfy expressions (18)–(21) is set, C/N can be made a maximum value.

In the foregoing description, the reduction in the signal level has been described as being not caused by the recording medium and the optical system, but it must be taken into account in exactly foreseeing the C/N in the actual optical system. As the causes of the reduction in the signal level, the following two points are conceivable:

(I) Loss of the quantity of light (the reduction in amplitude by absorption and eclipse); and
 (II) The phase difference between P-polarized light and S-polarized light. (I) and (II) contribute to the reduction in the magneto-optical modulated component intensity, and (I) alone contributes to the reduction in the non-modulated component intensity.

To evaluate the reduction in the magneto-optical non-modulated component intensity (loss of the quantity of light), the light utilization efficiency $\epsilon R$ is defined. It should be noted that in the present invention, as the light utilization efficiency, attention is paid to the ratio between the quantity of light on the recording medium and the quantity of light reaching the photodetector. In the present embodiment, when finding $\epsilon R$, the following points have been taken into consideration:

(A) The rate at which the diffracted light from the tracking grooves (pitch 1.6 μm, depth λ/8, λ=835 nm) enters the entrance pupil of the objective lens is regarded as the light utilization efficiency $\epsilon_0$; and
 (B) With the product along the optical path of the square of the P-polarization direction amplitude transmittances (or reflectances) of n optical elements except the analyzer present in the optical path leading from the recording medium to the photodetector being taken into consideration, the light utilization efficiency is defined as $\epsilon_1$. If the amplitude transmittance and reflectance of the ith optical element are tpi and rpi, respectively, $\epsilon_1$ can be expressed as follows:

$$\epsilon_1 = \prod_{i=1}^{n} |tp_i|^2 \tag{22}$$

In equation (22), where the light beam is reflected by the ith optical element, $|rpi|^2$ may be substituted instead of $|tpi|^2$. The transmittance of the analyzer is handled as an amount of variation during the calculation of C/N and is therefore excepted from $\epsilon_1$. From (A) and (B), the light utilization efficiency $\epsilon_r$ of the magneto-optical non-modulated component can be expressed as follows:

$$E_r = \epsilon_0 \epsilon_1 \tag{23}$$

The reduction in the intensity of the magneto-optical modulated component is now considered. For this purpose, the phase difference between the P-polarized light and the S-polarized light must be taken into account in addition to the loss of quantity of light.

Figure 1:
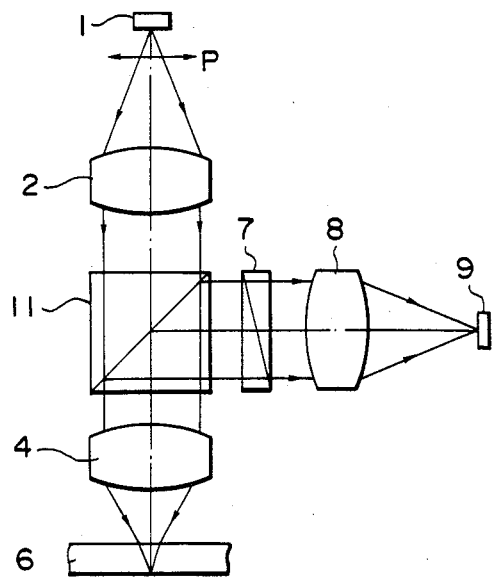
FIG. 1 schematically shows an example of a magneto-optical information reproducing apparatus according to the prior art.
Figure 2:
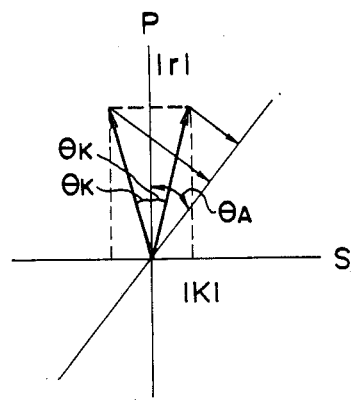
FIG. 2 illustrates the principle of the general magneto-optical signal detection.
Figure 5:
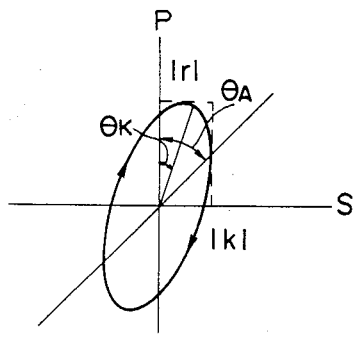
FIG. 5 shows the polarized state of the reflected light from a magneto-optical recording medium.

For example, it is known that as shown in FIG. 5, the reflected light from the recording medium is generally not a rectilinearly polarized light as shown in FIG. 2 but an elliptically polarized light whose major axis is inclined by the Kerr rotation angle $\theta k$ due to the phase difference created between the P-polarized component and the S-polarized component. That is, the P- and S-polarized components R and K of the amplitude reflectance of the recording medium can be expressed as follows:

$$\begin{cases} R = |R|\, e^{i\alpha o} \\ K = |K|\, e^{i\beta o} \\ \Delta o = \alpha o - \beta o \end{cases} \tag{24}$$

where $\alpha o$ and $\beta o$ are the phase components of respective amplitude reflectances.

In this case, the Kerr rotation angle $\theta_k$ can be expressed as follows:

$$\theta_K = \frac{|K|}{|R|} \cos\Delta o \tag{25}$$

If $\Delta o = n\pi$ (n=integer), the reflected light from the recording medium becomes a rectilinearly polarized light, but in the other cases, it decreases $\theta k$, and this is not preferable.

This also holds true of the optical elements, and in the present embodiment, the light utilization efficiency $\epsilon k$ is defined to evaluate the reduction in the intensity of the magneto-optical modulated component, and when finding $\epsilon k$, the following point has been taken into consideration.

For the magneto-optical modulated component, the light utilization efficiency is defined as $\epsilon_2$ with the product along the optical path of the P and S polarization direction amplitude transmittances (or reflectances) of n optical elements except the analyzer present in the optical path leading from the recording medium to the photodetector being taken into consideration. If the P and S polarization direction amplitude transmittances of the ith optical element are tpi and tsi (in the case of the reflectances, rpi and rsi), the following equations are established:

$$\begin{cases} tpi = |tpi|\, e^{i\alpha i} \\ tsi = |tsi|\, e^{i\beta i} \\ \Delta i = \alpha i - \beta i \end{cases} \quad (26)$$

By the use of (29), $\epsilon_2$ is expressed as follows:

$$\epsilon_2 = \epsilon_2' \cdot \epsilon_2'' = \frac{n}{\pi} \prod_{i=1} |tpi||tsi| \cdot \cos\left(\sum_{i=1}^{n} \Delta i\right) \quad (27)$$

In (27), where the light beam is reflected by the ith optical element, $|rpi||rsi|$ may be substituted instead of $|tpi|\cdot|tsi|$. The transmittance of the analyzer is handled as an amount of variation during the calculation of C/N and is therefore excepted from $\epsilon_2$.

Thus, the light utilization efficiency $\epsilon_k$ of the magneto-optical modulated component is expressed as follows:

$$\epsilon_k = \epsilon_0 \epsilon_2 \quad (28)$$

More accurate evaluation is also made of the analyzer.

If the amplitude transmittance and the extinction ratio of the analyzer are tA and $\eta A$, respectively, consideration may be given with $\cos\theta A$ substituted for by $|tA|\cdot(\cos\theta A + \sqrt{\eta A}\sin\theta A)$ and $\sin\theta A$ substituted for by $|tA|\cdot(\sin\theta A + \sqrt{\eta A}\cos\theta A)$ in equation (2). As $|R|^2 >> |K|^2$, the product of $\epsilon_k$ and the transmittance $\epsilon_3$ of the analyzer given by the following equaion may be taken for the magneto-optical modulated component intensity:

$$\epsilon_3 = |t_A|^2(1-\eta A)\sin^2\theta A \quad (29)$$

The amplitude transmittance of the analyzer has been equal between the P-polarized component direction and the S-polarized component direction and has provided no phase difference between the P-polarized light and the S-polarized light.

For the magneto-optical non-modulated component, the product of $\epsilon_R$ and the transmittance $\epsilon_4$ of the analyzer given by the following equation may be taken:

$$\epsilon_4 = |t_A|^2(\cos^2\theta A + \eta A \sin^2\theta A) \quad (30)$$

Thus, if the intensities of the magneto-optical modulated component and non-modulated component are $I_k$ and $I_r$, respectively, they are expressed as follows:

$$I_k \sim \frac{1}{\sqrt{2}} I_o \epsilon_o \epsilon_o' |R||K||t_A|^2 (1-\eta_A)\sin 2\theta_A \quad (31)$$

$$\cos\left(\sum_{i=0}^{n}\Delta i\right)$$

$$I_r \sim I_o \epsilon_o \epsilon_1 |R|^2 |t_A|^2 (\cos^2\theta_A + \eta_A \sin^2\theta_A) = \quad (32)$$

$$I_o \epsilon_r |R|^2 |t_A|^2 (\cos^2\theta_A + \eta_A \sin^2\theta_A)$$

By substituting expressions (31) and (32) into equation (17), the angle $\theta A$ of the optic axis of the analyzer with respect to the direction of polarization of the incident light beam which maximizes C/N can be found as follows:

$$\sin^2\theta_A \sim \quad (33)$$

$$\frac{f'_R + S' + t'}{(1-\eta_A)\{(1+\eta_A)f'_R + S'\}}\left\{1 - \sqrt{\frac{(\eta_A)^2 f'_R + \eta_A S' + t'}{f'_R + S' + t'}}\right\}$$

$$f'_R = \xi\,(\kappa\,\epsilon_r\,|t_A|^2\,|R|^2\,I_o)^2 \cdot \Delta B \quad (34)$$

$$S' = 2e\kappa\,\epsilon_r\,|t_A|^2\,|R|^2\,I_o \cdot \Delta B \quad (35)$$

$$t' = T \quad (36)$$

Conditions for calculation will be shown below.

The semiconductor laser 21 has a wavelength of $\lambda=835$ nm and the output thereof is adjusted irrespective of the transmittance $|tp|^2$ of the half-mirror 23 so that the quantity of incident light on the recording medium 26 is $I_O = 2\times 10^{-3}$W.

GdTbFeCo non-crystalline magnetic alloy is used as the recording layer of the recording medium 26, $|R|^2=0.12$, $\theta k=0.74°$ and the phase difference $\Delta o$ between the phase components $\alpha o$ and $\beta o$ of P- and S-polarization direction amplitude reflectances is $\Delta o=20°$.

The light utilization efficiency $\epsilon_o$ is $\epsilon_o=0.6$ when the diffracted light from the tracking grooves (pitch 1.6 μm and depth $\lambda/8$) is received by an objective lens of N.A.=0.5.

The light utilization efficiency $\epsilon_1$ is $\epsilon_1=0.39$ with the product of the transmittances (in the case of the half-mirror, the reflectances) of the optical elements except the analyzer present in the optical path leading from the recording medium to the photodetector being taken into consideration.

As regards the light utilization efficiency $\epsilon_2$, the product of the P and S amplitude transmittances (in the case of the half-mirror, the reflectances) of the optical elements except the analyzer present in the optical path leading from the recording medium to the photodetector may be taken into consideration. The half-mirror 23 used in the present embodimentis adapted to create a phase difference of $\Delta HM=160°$ beween the P-polarized light and the S-polarized light. Accordingly, between $\Delta HM$ and the phase difference $\Delta o$ created by the recording medium, there is a relation that $$\Delta o + \Delta HM = \pi \quad (37)$$

and thereby, any reduction in the magneto-optical modulated component intensity is prevented. In the present embodiment, there is no optical element which provides a phase difference between the P-polarized light and the S-polarized light during transmission and therefore, $$\Sigma_3'' = \cos\left(\sum_{i=0}^{n}\Delta i\right) = 1 \text{ and } |tpi| = |tsi| \text{ and hence, } \epsilon_2 = 0.39.$$

The photodetector 250 is an Si-PIN photodiode of photoelectric conversion factor $k=0.54$. The constants $\xi$ and $\zeta$ determined by the noise sources such as the recording medium and the semiconductor laser are given as follows:

$\xi = 2 \times 10^{-13}$ (R.I.N)

$\zeta = 1 \times 10^{-11}$ (R.I.N)

Also, the thermal noise T is given as $T = 5 \times 10^{-21}$ with the Boltzmann constant k being $k = 1.38 \times 10^{-23}$, the equivalent noise temperature Te being Te=300[K], the load resistance Rf being $Rf = 1 \times 10^{-5}[\Omega]$ and the band width $\Delta B$ of the signal detection being $\Delta B = 3 \times 10^4$ [1/Hz].

In some cases, the thermal noise T cannot be described in such a simple form as shown in equation (12) depending on the capacity or the like of the photodetector and therefore, in such cases, T need not conform to such form.

The analyzer has an amplitude transmittance tp of $|tp|^2 = 0.84$ and an extinction ration $\eta A = 1 \times 10^{-3}$.

Figure 6:
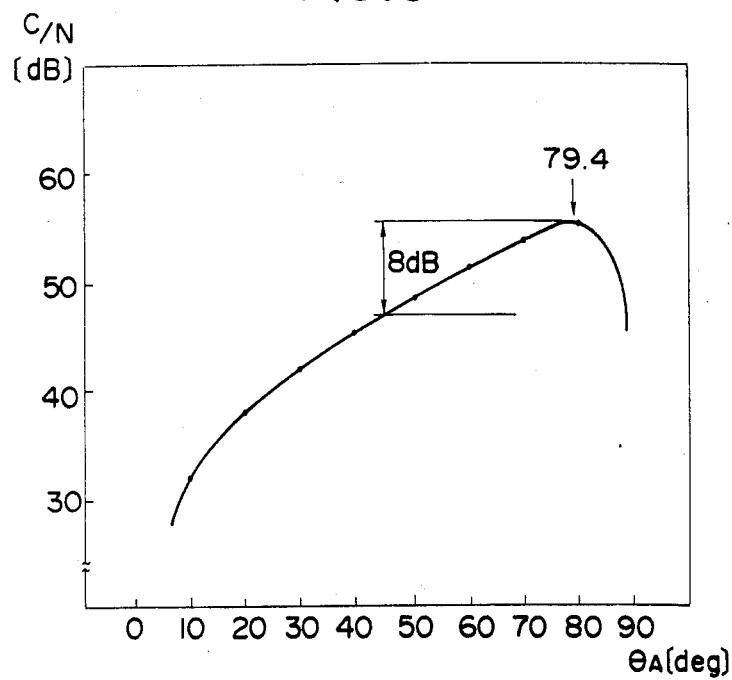
FIGS. 6 and 7 are graphs showing the relation between the azimuth angle of the optic axis of an analyzer in the embodiment shown in FIG. 3 and C/N.

FIG. 6 is a graph showing the relation between the angle $\theta A$ of the optic axis of the analyzer in the direction of polarization of the incident light beam and C/N. It is seen that the C/N of the present embodiment becomes maximum at optimum $\theta A = 79.4°$ given by expressions (33)–(36). In the present embodiment, as compared with the conventional apparatus in which $\theta A = 45°$, C/N is improved over 8 dB. If $\theta A = 70°$–85°, sufficiently good C/N will be obtained.

Figure 7:
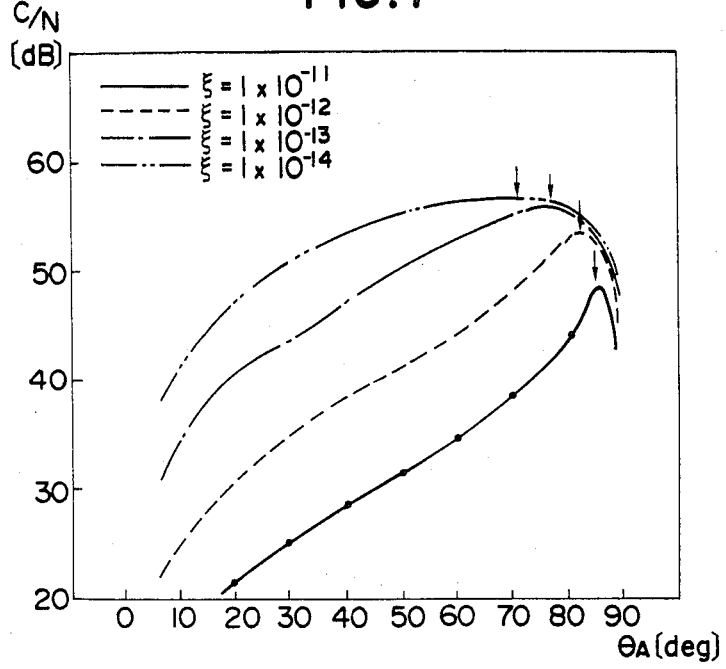

FIG. 7 is a graph showing the relation between $\theta A$ and C/N when the value of the constant $\xi$ which determines the square mean fluctuation of the magneto-optical non-modulated component intensity is changed to $\xi = 1 \times 10^{-11}, 10^{-12}, 10^{-13}, 10^{-14}$.

This graph shows that where due to expression (33), the noise $F_r$ attributable to $\Delta I_r^2$ and the shot noise S are great relative to the thermal noise T, the optimum value of $\theta A$ approaches 90°. Also comparing the C/N at the optimum value of $\theta A$ with the C/N at $\theta A = 45°$, it is seen that C/N is improved when $F_r$ and S becomes great relative to T. For example, where $\xi = 1 \times 10^{-11}$, C/N is improved over 18 dB, and this means that the present invention is very effective.

Figure 8A:
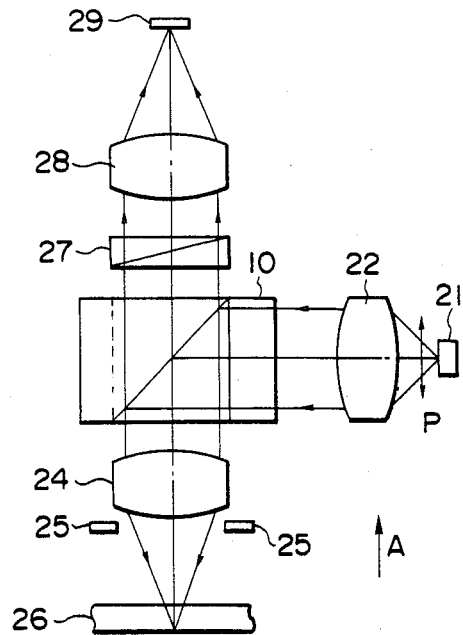
FIGS. 8A-11 schematically show further embodiments of the present invention.
Figure 8B:
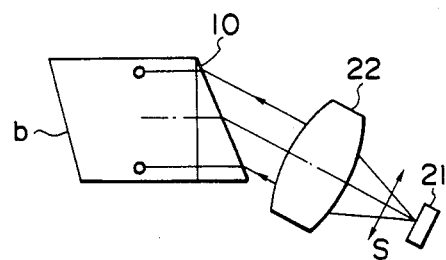

FIGS. 8A and 8B schematically show a second embodiment of the present invention, FIG. 8B being a view in which FIG. 8A is seen in the direction of arrow A. In FIGS. 8A and 8B, members similar to those in FIG. 3 are given similar reference numerals and need not be described in detail. Again in the present embodiment, the signal processing system subsequent to the photodetector 29 is constructed as shown in FIG. 4. The present embodiment employs a half-mirror 10 in place of the half-mirror 23 in the first embodiment, and is designed to detect the light transmitted through this half-mirror 10. The surface b of the half-mirror 10 is inclined by a predetermined angle so that stray light may not enter the photodetector 29.

In the present embodiment, consideration may be given with the P- and S-polarization directions used in the description of FIG. 3 being replaced with each other.

Figure 9:
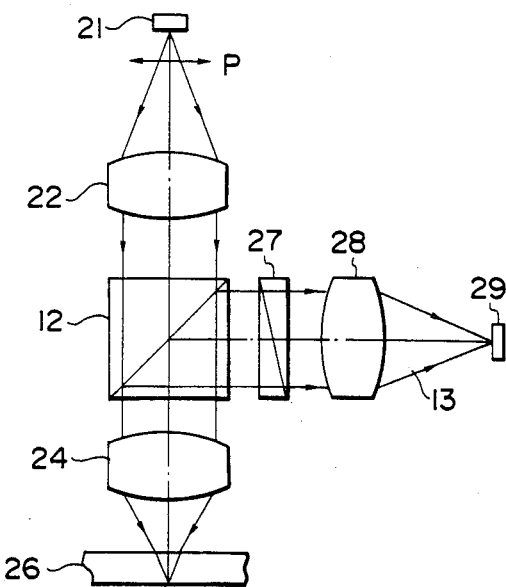

FIG. 9 schematically shows the construction of a third embodiment of the present invention. In FIG. 9, members similar to those in FIG. 3 are given similar reference numerals and need not be further described.

$$\begin{cases} I_{+\theta K} = I_o \{R\, r_p\, t_A (\cos\theta_A + \sqrt{\eta_A}\, \sin\theta_A) + \\ \qquad K\, r_s\, t_A (\sin\theta_A + \sqrt{\eta_A}\, \cos\theta_A) \}^2 \\ I_{-\theta K} = I_o \{R\, r_p\, t_A (\cos\theta_A + \sqrt{\eta_A}\, \sin\theta_A) - \\ \qquad K\, r_s\, t_A (\sin\theta_A + \sqrt{\eta_A}\, \cos\theta_A) \}^2 \end{cases} \quad (38)$$

With the fact that $|R|^2 >> |K|^2$ being taken into consideration, equation (38) is expressed as follows:

$$\begin{cases} I_{+\theta k} \sim I_o |t_A|^2 \{|R|^2 |r_p|^2 (\cos^2\theta_A + \eta_A \sin^2\theta_A) + \\ \qquad |R||K||r_p||r_s| (1 - \eta_A) \sin 2\theta_A\} \\ I_{-\theta k} \sim I_o |t_A|^2 \{|R|^2 |r_p|^2 (\cos^2\theta_A + \eta_A \sin^2\theta_A) - \\ \qquad |R||K||r_p||r_s| (1 - \eta_A) \sin 2\theta_A\} \end{cases} \quad (39)$$

In expression (39), the second term in the parentheses is the magneto-optical modulated component and the first term in the parentheses is the non-modulated component, and the intensities thereof are $I_k$ and $I_r$, respectively.

$$I_k \sim \frac{1}{\sqrt{2}} I_o |t_A|^2 |R||K||r_p||r_s| (1 - \eta_A) \sin 2\theta_A \quad (40)$$

$$I_r \sim I_o |t_A|^2 |R|^2 |r_p|^2 (\cos^2\theta_A + \eta_A \sin^2\theta_A) \quad (41)$$

Again in the present embodiment, the signal processing system subsequent to the photodetector 29 is constructed as shown in FIG. 4.

The present embodiment employs a polarizing beam splitter 12 instead of the half-mirror 23 shown in FIG. 3. When the amplitude transmittances of the polarizing beam splitter 12 for the P-polarized light and S-polarized light are tp and ts, respectively, and the amplitude reflectances thereof are rp and rs, respectively, and the amplitude transmittance of the analyzer 27 is $t_A$ (equal between the direction of P-polarization and the direction of S-polarization) and the extinction ratio is $\eta A$ and the intensity of the incident light on the medium is $I_O$, the intensity of the detectin light 13 can be expressed as above.

It is to be understood that the output of the semiconductor laser is adjusted irrespective of the amplitude transmittances tp and ts of the polarizing beam splitter so that the incident light $I_O$ may be of a predetermined quantity of light.

Considering the $\theta A$-dependencies of the respective noises in the process similar to the aforementioned expressions (6)–(12), the magneto-optical modulated component intensity $I_k$ has a dependency of $(1-\eta A) \sin 2\theta A$ and the non-modulated component intensity $I_r$ has a dependency of $\cos^2\theta A + \eta A \sin^2\theta A$ and therefore, the $\theta A$-dependencies of the respective noises can be expressed as follows:

$$FR \propto (\cos^2\theta A + \eta A \sin^2\theta A)^2 \quad (42)$$

$$FK \propto (1-\theta A) \sin 2\theta A \quad (43)$$

$$S \propto \cos^2\theta A + \eta A \sin^2\theta A \quad (44)$$

$$T = \text{const} \quad (45)$$

If by the use of these, C/N is to be expressed in decibel indication, it can be expressed by the following equation (17') as in the embodiment of FIG. 3. However, unlike the case of FIG. 3, $I_k$, $I_r$, etc. conform to expressions (38)–(41).

$$C/N = 10 \log_{10}\left\{ \frac{1}{2} \kappa^2 I_k^2 \Big/ \left( \xi \kappa^2 I_r^2 + \frac{1}{2} \xi \kappa^2 I_k^2 + 2e\kappa I_r + \frac{4kTe}{R_f} \right) \Delta B \right\} \quad (17')$$

The C/N of equation (17') is a function of the amplitude reflectances rp and rs of the polarizing beam splitter and the inclination $\theta_A$ of the optic axis of the analyzer with respect to the direction of P-polarization and therefore, equation (17') may be differentiated by $|rp|$, $|rs|$ and $\theta_A$ to find a maximum value.

C/N can be made a maximum value by the following conditions:

$$|rp|^2 = \sqrt{\frac{T}{\xi \Delta B}} \cdot \frac{1}{\kappa |t_A|^2 |R|^2 I_O} \quad (46)$$

$$0 \leq |rp|^2 \leq 1 \quad (47)$$

$$|rs|^2 = 1 \quad (48)$$

$$\theta_A = \sin^{-1}\left( \frac{1}{\sqrt{1 + \sqrt{\eta_A}}} \right) \quad (49)$$

Figure 10:
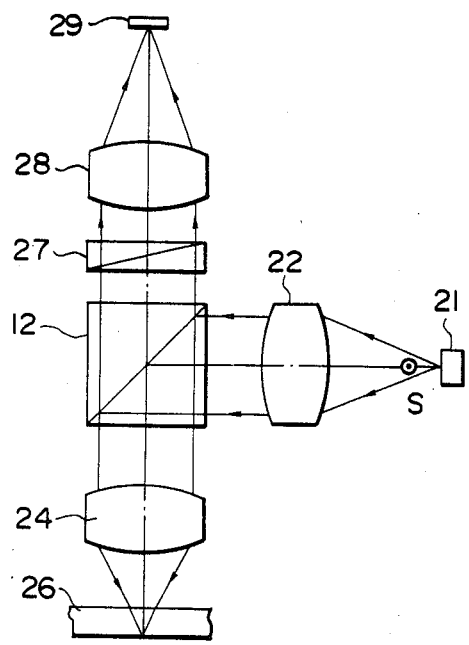

FIG. 10 schematically shows the construction of an optical system according to a fourth embodiment of the present invention. The present embodiment is a modification of the third embodiment in which the light beam transmitted through the polarizing beam splitter 12 is detected. In FIG. 10, members similar to those in FIG. 9 are given similar reference numerals and need not be described in detail. Also, the signal processing circuit may be similar to that shown in FIG. 4.

In the case of the present embodiment, consideration may be given with the direction of polarization of the semiconductor laser 21 being regarded as the direction of S-polarization perpendicular to the plane of the drawing sheet and with the directions of P-polarization and S-polarization used in the description of FIG. 9 being replaced with each other. However, in expressions (38)–(41), rp and rs need be replaced with ts and tp, respectively. That is, $$I_k \sim \frac{1}{\sqrt{2}} I_o |t_A|^2 |R||K||ts||tp| (1 - \eta_A) \sin 2\theta_A \quad (50)$$

$$I_r \sim I_o |t_A|^2 |R|^2 |ts|^2 (\cos^2 \theta_A + \eta_A \sin^2 \theta_A) \quad (51)$$

The C/N of equation (17') is a function of the amplitude transmittances ts and tp of the polarizing beam splitter and the inclination $\theta_A$ of the optic axis of the analyzer with respect to the direction of P-polarization and therefore, equation (17') may be differentiated by $|ts|$, $|tp|$ and $\theta_A$ to find a maximum value. Accordingly, C/N can be made a maximum value by the following conditions:

$$|ts|^2 = \sqrt{\frac{T}{\xi \cdot \Delta B}} \cdot \frac{1}{\kappa |t_A|^2 |R|^2 I_O} \quad (52)$$

$$0 \leq |ts|^2 \leq 1 \quad (53)$$

$$|tp|^2 = 1 \quad (54)$$

$$\theta_A = \sin^{-1}\left( \frac{1}{\sqrt{1 + \sqrt{\eta_A}}} \right) \quad (55)$$

Figure 11:
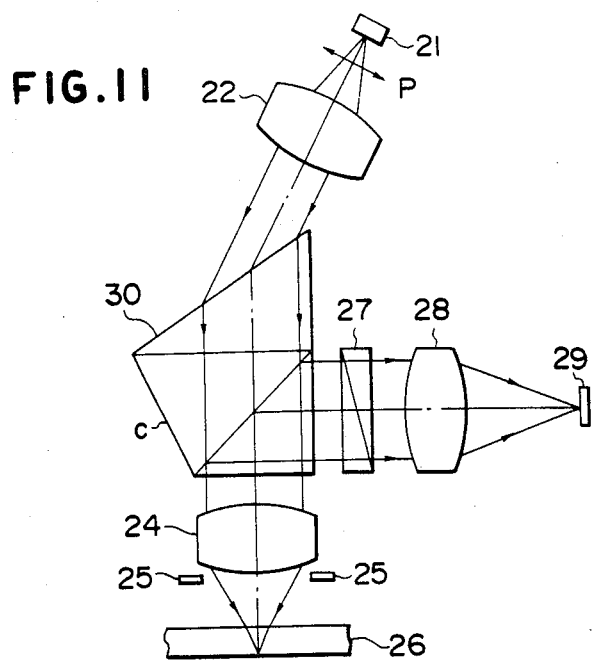

FIG. 11 schematically shows fifth embodiment of the present invention. In FIG. 11, members similar to those in FIG. 3 are given similar reference numerals and need not be described in detail. Again in the present embodiment, the signal processing system subsequent to the photodetector 29 is constructed as shown in FIG. 4.

In the present embodiment, a polarizing beam splitter 30 having the beam shaping function is employed instead of the half-mirror 23 in the first embodiment. The surface C of the polarizing beam splitter 30 is inclined by a predetermined angle so that stray light may not enter the photodetector 29.

Even where a polarizing beam splitter is employed as in the third to fifth embodiments, the reduction in the signal level by the recording medium and the optical system must be taken into consideration. The influences of the other elements than the polarizing beam splitter are entirely similar to those described previously in connection with expressions (22)–(28).

As regards the polarizing beam splitter, if the amplitude reflectances in the directions of P-polarization and S-polarization are rp and rs, respectively.

$$\begin{cases} rp = |rp| \, e^{i\gamma} \\ rs = |rs| \, e^{i\delta} \\ \Delta_{pbs} = \gamma - \delta \end{cases} \quad (56)$$

where $\gamma$ and $\delta$ are the phase components of the respective amplitude reflectances. Thus, if the intensities of the magneto-optical modulated component and now-modulated component are $I_k$ and $I_R$, respectively, they may be expressed as follows:

$$I_k \sim \frac{1}{\sqrt{2}} I_O \epsilon_0 \epsilon_2' |rp||rs||R||K| \quad (57)$$

$$(1 - \eta_A) \sin 2\theta_A \cos\left( \sum_{i=0}^{n} \Delta_i + \Delta_{PBS} \right)$$

$$I_r \sim I_o \epsilon_0 \epsilon_1 \cdot |rp|^2 |R|^2 (\cos^2 \theta_A + \eta_A \sin^2 \theta_A) = \quad (58)$$

$$I_o \epsilon_R |rp|^2 |R|^2 (\cos^2 \theta_A + \eta_A \sin^2 \theta_A)$$

By substituting expressions (57) and (58) into equation (17'), the polarizing characteristic of the polarizing beam splitter which maximizes C/N and the angle $\theta_A$ of the optic axis of the analyzer with respect to the direction of P-polarization can be found as follows:

$$|rp|^2 = \sqrt{\frac{T}{\xi \Delta B}} \cdot \frac{1}{\kappa \epsilon_r |t_A|^2 |R|^2 I_O} \tag{59}$$

$$0 \leq |rp|^2 \leq 1 \tag{60}$$

$$|rs|^2 = 1 \tag{61}$$

$$\theta_A = \sin^{-1}\left(\frac{1}{\sqrt{1 + \sqrt{\eta_A}}}\right) \tag{62}$$

Conditions for calculation will be shown below.

The semiconductor laser 21 has an S wavelength of $\lambda = 835$ nm, and the output thereof is adjusted irrespective of the transmittance $|tp|^2$ of the polarizing beam splitter so that the quantity of incident light $I_O$ on the recording medium 26 is $I_O = 2 \times 10^{-3}$W.

GdTbFeCo non-crystalline magnetic alloy is used as the recording layer of the recording medium 26, and $|R|^2 = 0.12$, $\theta K = 0.74°$, and the phase difference $\Delta 0$ between the phase components $\alpha O$ and $\beta 0$ of the amplitude reflectances in the directions of P-polarization and S-polarization is $\Delta 0 = 20°$.

The light utilization efficiency $\epsilon 0 = 0.6$ when the diffracted light from the tracking grooves (pitch 1.6 $\mu$m and depth $\lambda/8$) is received by an objective lens of N.A.$=0.5$. The light utilization efficiency $\epsilon 1$ is $\epsilon 1 = 0.79$ with the product of the transmittances of the optical elements except the polarizing beam splitter and analyzer present in the optical path leading from the recording medium to the photodetector being taken into consideration.

As regards the light utilization efficiency $\epsilon 2$, the product of the P and S amplitude transmittances of the optical elements except the polarizing beam splitter and analyzer present in the optical path leading from the recording medium to the photodetector may be considered. In the present embodiment, there is no optical element which provides a phase difference between the P-polarized light and the S-polarized light during the transmittance and therefore, $$\epsilon 2'' = \cos\left(\sum_{i=1}^{n} \Delta_i\right) = 1 \text{ and } |tpi| = |tsi| \text{ and hence, } \epsilon 2 = 0.79.$$

The photodetector 25 is an Si-PIN photodiode of photoelectric conversion efficiency $k = 0.54$. The constants $\xi$ and $\zeta$ determined by the noise sources such as the recording medium and the semiconductor laser are given as follows:

$$\xi = 2 \times 10^{-13} \text{ (R.I.N.)}$$

$$\zeta = 1 \times 10^{-11} \text{ (R.I.N.)}$$

Also, the thermal noise T is given as $T = 5 \times 10^{-21}$ with the Boltzmann constant K being $K = 1.38 \times 10^{-23}$, the equivalent noise temperature Te being Te$=300$[K], the load resistance Rf being Rf$=1 \times 10^5$[$\Omega$] and the band width $\Delta B$ of the signal detection being $\Delta B = 3 \times 10^4$[1/Hz]. In some cases, the thermal noise T cannot be described in the simple form as shown in equation (12) due to the capacity or the like of the photodetector and therefore, in such case, it need not conform to such form. The transmittance of the analyzer is $|t_A|^2 = 0.84$ and the extinction ratio thereof is $\eta A = 1 \times 10^{-3}$.

Figure 12:
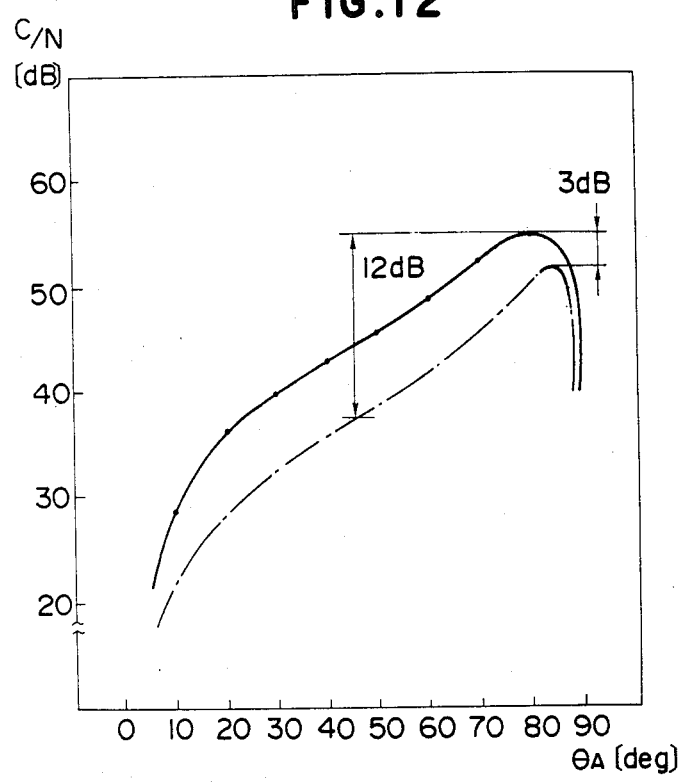
FIGS. 12 and 13 are graphs showing the relation between the azimuth of the optic axis of an analyzer in an embodiment using a polarizing beam splitter and C/N and the relation between the polarizing characteristic of the polarizing beam splitter and C/N, respectively.

FIG. 12 shows the C/N of the present embodiment (indicated by solid line) using a polarizing beam splitter having the polarizing characteristics $|rp|^2 = 0.18$ and $|rs|^2 = 1$ given by expressions (59), )60) and (61) and the C/N of the apparatus (indicated by dot-and-dash line) using a half-mirror. In FIG. 12, the ordinate represents C/N and the abscissa represents the angle $\theta A$ of the optic axis of the analyzer with respect to the direction of P-polarization. In the present embodiment, for $\theta A = 79.9°$, C/N becomes maximum. Also, if $\theta A$ is 75°-85°, sufficiently good C/N can be obtained.

Figure 13:
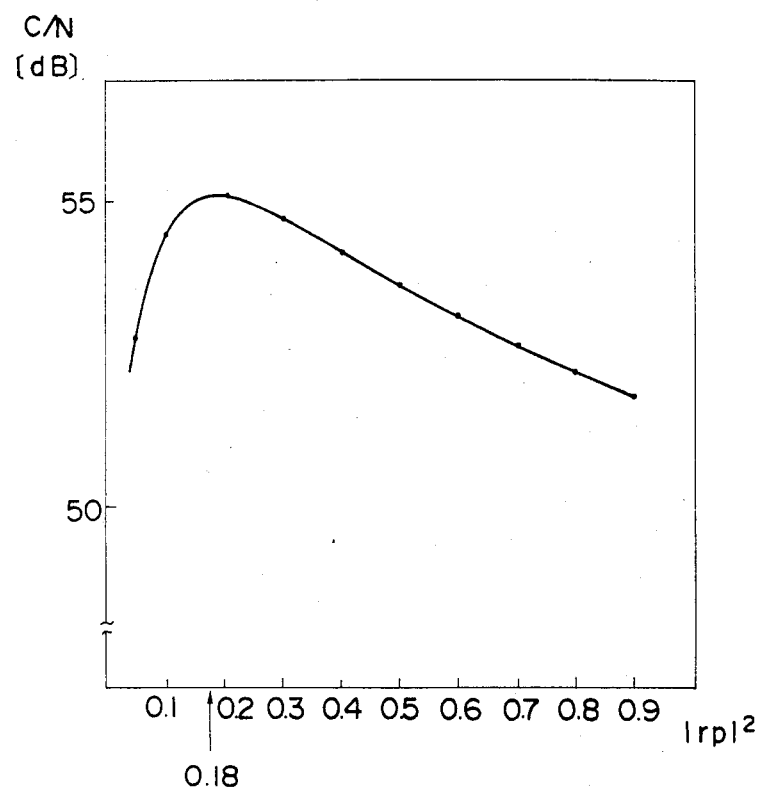

FIG. 13 is a graph showin the relation between the polarizing characteristic $|rp|^2$ of the polarizing beam splitter and C/N. In FIG. 13, the ordinate represents C/N and the abscissa represents $|rp|^2$, and in any of these $|rs|^2 = 1$ and $\theta A = 79.9°$. From this, sufficiently good C/N could be obtained if $|rp|^2$ is 0.08-0.4.

In the present embodiment, the phase difference $\Delta$PBS between the directions of P-polarization and S-polarization created by the polarizing beam splitter is $\Delta$PBS$= 160°$ in any case, and has the relation that $$\Delta_0 + \Delta \text{PBS} = \pi \tag{63}$$

with respect to the phase difference $\Delta 0$ created by the recording medium. Thereby, any reduction in the magneto-optical modulated component intensity is prevented. It is easy to make a polarizing beam splitter of such polarizing characteristic.

Figure 14A:
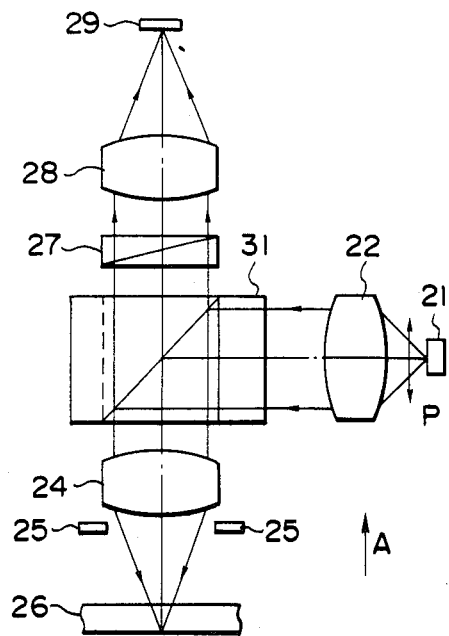
FIGS. 14A and 14B schematically show still another embodiment of the present invention.
Figure 14B:
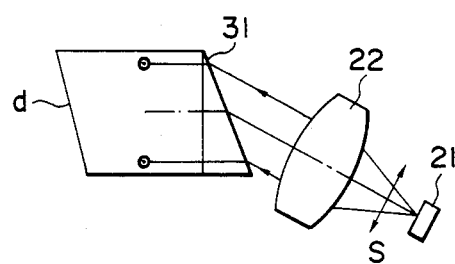

FIGS. 14A and 14B schematically show a sixth embodiment of the present invention. FIG. 14B being a view in which FIG. 14A is seen in the direction of arrow A. In FIGS. 14A and 14B, members similar to those in FIG. 11 are given similar reference numerals and need not be described in detail. Again in the present embodiment, the signal processing system subsequent to the photodetector 29 is constructed as shown in FIG. 4. The present embodiment uses a polarizing beam splitter 31 instead of the polarizing beam splitter 30 in the fifth embodiment, and is designed to detect the light transmitted through this polarizing beam splitter 31. The surface d of the polarizing beam splitter 31 is inclined by a predetermined angle so that stray light may not enter the photodetector 29.

In the present embodiment, consideration may be given with the directions of P-polarization and S-polarization used in the description of FIG. 11 being replaced with each other. However, in expressions (57) and (58), rp and rs need be replaced with ts and tp, respectively. That is, if the intensities of the magneto-optical modulated component and non-modulated component are $I_k$ and $I_r$, respectively, they can be expressed as follows:

$$I_k \sim \frac{1}{\sqrt{2}} I_o \epsilon_o \epsilon_2' |ts||tp||R||K| (1 - \eta_A) \tag{64}$$

$$I_r \sim I_O \epsilon_0 \epsilon_1 |ts|^2 |R|^2 (\cos^2 \theta_A + \eta_A \sin^2 \theta_A) \cdot \frac{\sin 2\theta_A \cdot \cos\left(\sum_{i=0}^{n} \Delta_i + \Delta_{PBS}\right)}{} \tag{65}$$

By substituting expressions (64) and (65) into equation (17'), the polarizing characteristic of the polarizing beam splitter which maximizes C/N and the angle of the optic axis of the analyzer with respect to the direction of P-polarization can be derived from the following expressions:

$$|ts|^2 = \sqrt{\frac{T}{\xi \Delta B}} \cdot \frac{1}{\kappa \epsilon_r |t_A|^2 |R|^2 I_O} \quad (66)$$

$$0 \leq |ts|^2 \leq 1 \quad (67)$$

$$|tp|^2 = 1 \quad (68)$$

$$\theta_A = \sin^{-1}\left(\frac{1}{\sqrt{1 + \sqrt{\eta_A}}}\right) \quad (69)$$

If the conditions for calculation are selected in the same manner, there will be obtained a result similar to the result shown in FIGS. 12 and 13. However, the abscissa represents $|ts|^2$.

It is easy to make such a polarizing beam splitter having a polarizing characteristic which will compensate for the phase difference between the directions of P-polarization and S-polarization created by the recording medium.

Besides the above-described embodiments, the present invention permits various applications. For example, in the embodiments illustrated, the reflected light from the magneto-optical recording medium has been detected, whereas design may be made such that the light beam transmitted through the magneto-optical recording medium and modulated by the Faraday effect is detected. The present invention covers all such applications without departing from the scope thereof as defined in the appendec claims.

What is claimed is:

1. A magneto-optical information reproducing apparatus comprising means for applying a light beam polarized in a predetermined direction onto a recording medium on which information is magnetically recorded, analyzer means for analyzing the reflected or transmitted light beam from said recording medium modulated into a polarized state in conformity with said information by the magneto-optical effect, a photodetector having no amplifying action and photoelectrically detecting the light beam transmitted through said analyzer means, and amplifying means for amplifying the detection signal of said photodetector and reproducing said information, characterized in that the single $\theta A$ formed between the optic axis of said analyzer means and said predetermined direction satisfies the following conditions:

$$\sin^2\theta_A \sim$$

$$\frac{F_R + S + T}{(1 - \eta_A)\{(1 + \eta_A)F_R + S\}} \left(1 - \sqrt{\frac{(\eta_A)^2 F_R + \eta_A S + T}{F_R + S + T}}\right)$$

$$F_R = \xi \cdot (\kappa \epsilon |t_A|^2 |R|^2 I_O)^2 \cdot \Delta B$$

$$S = 2e\kappa\epsilon|t_A|^2 |R|^2 I_O \cdot \Delta B$$

where the average of the intensities of polarized components entering said photodetector and not modulated by the magneto-optical effect is $I_r$, the square mean of the intensity fluctuation in a magneto-optical signal observation frequency is $I_r^2$, $\xi = \Delta I_r^2/I_r^2$, the quantity of light of the incident light beam on said recording medium is $I_O$, the amplitude reflectance of said recording medium is R, the light utilization efficiency of the optical system from the recording medium to be photodetector except said analyzer means is $\epsilon$, the photo-electric conversion efficiency of said photodetector is k, the amount of charge is e, the thermal noise of said amplifying means in the magneto-optical signal observation frequency is T, the band width of the detection singal is $\Delta B$, the amplitude transmittance of said analyzer means is tA, and the extinction ratio of said analyzer means is $\eta$A.

2. A magneto-optical information reproducing apparatus according to claim 1, wherein said means for applying a light beam comprises a semiconductor laser, and an optical system for condensing the light beam emitted from said semiconductor laser on said medium.

3. A magneto-optical information reproducing apparatus according to claim 2, wherein said optical system includes a half-mirror for separating the reflected light from said medium from the light beam applied to said medium and directing it to said analyzer means.

4. A magneto-optical information reproducing apparatus according to claim 1, wherein said photodetector is a PIN photodiode.

5. A magneto-optical information reproducing apparatus comprising means for applying a light beam polarized in a predetermined direction onto a recording medium on which information is magnetically recorded, a polarizing beam splitter for reflecting and transmitting therethrough the reflected or transmitted light beam from said recording medium, said light beam being modulated into a polarized state in conformity with said information by the magneto-optical effect, at a predetermined rate corresponding to the polarized component thereof, analyzer means for analyzing the light beam reflected by said polarizing beam splitter, a photodetector having no amplifying action and photoelectrically detecting the light beam transmitted through said analyzer means, and amplifying means for amplifying the detection signal of said photodetector and reproducing said information, characterized in that the amplitude reflectance rp of said polarizing beam splitter for the polarized component in said predetermined direction, the amplitude reflectance rs of said polarizing beam splitter for the polarized component in a direction perpendicular to said predetermined direction and the angle $\theta A$ formed between the optic axis of said analyzer means and said predetermined direction satisfy the following conditions:

$$|r_p|^2 \sim \sqrt{\frac{T}{\xi \cdot \Delta B}} \cdot \frac{1}{\kappa \epsilon |t_A|^2 |R|^2 I_O}$$

$$0 \leq |r_p|^2 \leq 1$$

$$|r_s|^2 \sim 1$$

$$\sin \theta_A \sim \frac{1}{\sqrt{1 + \sqrt{\eta_A}}}$$

where the average of the intensities of polarized components entering said photodetector and not modulated by the magneto-optical effect is $I_r$, the square mean of the intensity fluctuation in a magneto-optical signal observation frequency is $\Delta I_r^2$, $\xi = \Delta I_r^2/I_r^2$, the quantity of light of the incident light beam on said recording medium is $I_O$, the amplitude reflectance of said recording medium is R, the light utilization efficiency of the optical system from the recording medium to the photodetector except said polarizing beam splitter and said analyzer means is $\epsilon$, the amplitude transmittance of said analyzer means is tA, the extinction ratio of said analyzer means is $\eta A$, the photoelectric conversion efficiency of said photodetector is k, the thermal noise of said amplifying means in the magneto-optical signal observation frequency is T, and the band width of the detection signal is $\Delta B$.

6. A magneto-optical information reproducing apparatus according to claim 5, wherein said means for applying a light beam comprises a photoconductor laser, and an optical system for condensing the light beam emitted from said photoconductor laser on said medium.

7. A magneto-optical information reproducing apparatus according to claim 5, wherein said photodetector is a PIN photodiode.

8. A magneto-optical information reproducing apparatus comprising means for applying a light beam polarized in a predetermined direction onto a recording medium on which information is magnetically recorded, a polarizing beam splitter for reflecting and transmitting therethrough the reflected or transmitted light beam from said recording medium modulated into a polarized state in conformity with said information by the magneto-optical effect, at a predetermined rate corresponding to the polarized component thereof, analyzer means for analyzing the light beam transmitted through said polarizing beam splitter, a photodetector having no amplifying action and photoelectrically detecting the light beam transmitted through said analyzer means, and amplifying means for amplifying the detection signal of said photodetector and reproducing said information, characterized in that the amplitude transmittance ts of said polarizing beam splitter for the polarized component in said predetermined direction, the amplitude transmittance tp of said polarizing beam splitter for the polarized component in a direction perpendicular to said predetermined direction and the angle $\theta A$ formed between the optic axis of said analyzer means and said predetermined direction satisfy the following conditions:

$$|ts|^2 = \sqrt{\frac{T}{\xi \cdot \Delta B}} \cdot \frac{1}{\kappa \epsilon |t_A|^2 |R|^2 I_O}$$

$$0 \leq |ts|^2 \leq 1$$

$$|tp|^2 \sim 1$$

$$\sin \theta_A \sim \frac{1}{\sqrt{1 + \sqrt{\eta_A}}}$$

where the average of the intensities of polarized components entering said photodetector and not modulated by the magneto-optical effect is $I_r$, the square means of the intensity fluctuation in a magneto-optical signal observation frequency is $\Delta I_r^2$, $\xi = I_r^2/I_r^2$, the quantity of light of the incident light beam on said recording medium is $I_O$, the amplitude reflectance of said recording medium is R, the light utilization efficiency of the optical system from the recording medium to the photodetector except said polarizing beam splitter and said analyzer means is $\epsilon$, the amplitude transmittance of said analyzer means is tA, the extinction ratio of said analyzer means is $\eta A$, the photoelectric conversion efficiency of said photodetector is k, the thermal noise of said amplifying means in the magneto-optical signal observation frequency is T, and the band width of the detection signal is $\Delta B$.

9. A magneto-optical information reproducing apparatus according to claim 8, wherein said means for applying a light beam comprises a semiconductor laser, and an optical system for condensing the light beam emitted from said semiconductor laser on said medium.

10. A magneto-optical information reproducing apparatus according to claim 8, wherein said photodetector is a PIN photodiode.

* * * * *